(12) United States Patent
Diloy Barrio

(10) Patent No.: US 6,214,898 B1
(45) Date of Patent: Apr. 10, 2001

(54) MODIFIED POLYESTER RESIN/ORGANIC PEROXIDE SYSTEMS FOR POWDER COATINGS WHICH ARE APPLICABLE TO TEMPERATURE SENSITIVE AND METALLIC SUBSTRATES

(75) Inventor: José Luis Diloy Barrio, Barcelona (ES)

(73) Assignee: Herberts Gesellschaft mit beschränkter Haftung, Wuppertal (DE)

( * ) Notice: Subject to any disclaimer, the term of this patent is extended or adjusted under 35 U.S.C. 154(b) by 0 days.

(21) Appl. No.: 09/155,651

(22) PCT Filed: Apr. 2, 1997

(86) PCT No.: PCT/EP97/01655

§ 371 Date: Oct. 2, 1998

§ 102(e) Date: Oct. 2, 1998

(87) PCT Pub. No.: WO97/38034

PCT Pub. Date: Oct. 16, 1997

(30) Foreign Application Priority Data

Apr. 3, 1996 (ES) .................................................. 9600800

(51) Int. Cl.$^7$ ................................ C08F 2/46; C08G 63/52
(52) U.S. Cl. ............................ 522/24; 528/272; 528/302; 528/303; 528/306; 528/308; 522/60; 522/93
(58) Field of Search ..................................... 528/272, 302, 528/303, 306, 308; 522/24, 60, 93

(56) References Cited

U.S. PATENT DOCUMENTS

| | | | |
|---|---|---|---|
| 3,340,327 | * | 9/1967 | Spellberg et al. . |
| 3,953,403 | * | 4/1976 | Fujiyoshi et al. . |
| 4,075,261 | * | 2/1978 | Fujiyoshi et al. . |
| 4,107,148 | * | 8/1978 | Fujiyoshi . |
| 4,410,680 | | 10/1983 | Brownscom . |
| 5,420,205 | * | 5/1995 | Becker . |
| 5,464,909 | * | 11/1995 | Chang . |

FOREIGN PATENT DOCUMENTS

| | | | |
|---|---|---|---|
| 0309088 | * | 9/1987 | (EP) . |
| 0 309 088 A2 | | 3/1989 | (EP) . |
| 0 368 415 A2 | | 5/1990 | (EP) . |
| 0368415 | * | 5/1990 | (EP) . |
| 0 517 535 A2 | | 12/1992 | (EP) . |
| 0517535 | * | 12/1992 | (EP) . |
| 54-150440 | | 9/1992 | (JP) . |
| 49-040348 | | 8/1993 | (JP) . |
| 49-093425 | | 8/1993 | (JP) . |
| 49-128939 | | 8/1993 | (JP) . |
| 49-129725 | | 8/1993 | (JP) . |
| 55-025462 | | 8/1993 | (JP) . |
| 52-150443 | | 9/1993 | (JP) . |
| 54-158440 | | 9/1993 | (JP) . |
| 55-003416 | | 9/1993 | (JP) . |
| 55-027307 | | 9/1993 | (JP) . |
| 55-027324 | | 9/1993 | (JP) . |
| 56-100870 | | 9/1993 | (JP) . |
| 57-209965 | | 9/1993 | (JP) . |
| WO92/14792 | * | 9/1992 | (WO) . |
| WO97/38034 | * | 10/1997 | (WO) . |

OTHER PUBLICATIONS

Patent Abstracts of Japan, vol. 004, No. 025 (M–001), Mar. 5, 1980 & JP 55001945 (Jan. 9, 1980).
EPO/JPA 5 5001945, Jan. 1980.*
PCT/EP97/01655, International Search Report.*

* cited by examiner

*Primary Examiner*—Samuel A. Acquah
(74) *Attorney, Agent, or Firm*—Pillsbury Winthrop LLP

(57) ABSTRACT

New modified polyester resin/organic peroxide systems for powder coatings which are applicable to temperature sensitive and metallic substrates include (a) a polyester resin which is a hydroxylated or carbonxylated polyester with unsaturation in its chain, and (b) an organic peroxide with a minimum curing temperature of between 140° and 190° C.; the relative proportions of resin and organic peroxides being 55–60% by weight of resin based on the final composition and 0.5–3.0 by weight of organic peroxide based on the final formulation. These systems find their main application in the manufacture of powder coatings for the coating of temperature sensitive substrates like plastics and metallic substrates, especially aluminum substrates, using the systems currently existing in industry.

9 Claims, No Drawings

MODIFIED POLYESTER RESIN/ORGANIC PEROXIDE SYSTEMS FOR POWDER COATINGS WHICH ARE APPLICABLE TO TEMPERATURE SENSITIVE AND METALLIC SUBSTRATES

This application is the national phase of international application PCT/EP97/01655 filed Apr. 2. 1997.

TECHNICAL FIELD OF THE INVENTION

The present invention lies within the technical field of powder coatings intended for the coating of aluminium substrates.

More specifically, the present invention provides some new modified polyester resin/organic peroxide systems which are especially appropriate for the said type of coatings, which are a significant improvement over the systems currently employed in that they lack properties harmful to health and are economically more advantageous.

PRIOR ART

Powder coatings have been employed since the sixties, having flourished greatly as a result of technical and economic environmental considerations.

Powder coatings are dry, solid, film-forming coating formulations. In fact, powder coatings may be regarded as a paint once the coated substrate emerges from the curing or melting oven.

Powder coatings are typically formulated by combining the following ingredients:

Resin

Curing or hardening agent

Filler

Pigments or colorants

Other additives

The basic or defining ingredients of a particular coating are defined by the resin/hardening agent system.

The other ingredients are incorporated in accordance with the colour and appearance and the ultimate application for which the coating is intended.

Among the resins most extensively distributed worldwide, epoxy resins, polyester resins and acrylic resins may be mentioned.

Among typical curing agents, solid aliphatic amines (for example Dicyandiamide), solid amine derivatives, solid phenolic resins, solid anhydride compounds, solid blocked isocyanate adducts, solid polyepoxides (for example TGIC) and solid dicarboxylic acids may be mentioned.

Turning our attention now to the polyester resin, three types of system are mainly used:

Polyester/TGIC (triglycidyl isocyanurate)

Polyester/epoxy hybrids

Polyester/isocyanate (or urethane systems).

Of these systems, the polyester/TGIC system has been extensively developed in Europe, since it gives rise to coatings with very good properties for outdoor use, especially for the coating of metal substrates such as steel and aluminium, such as, for example, aluminium sections for windows and doors exposed to the weather.

The problem arising with these systems is the high toxicity of TGIC, a product of mutagenic character apart from being irritant to the skin and the mucosae, toxic on inhalation, and the like. These collective features compel the introduction of robust safety measures from the stand-point of the health of the workforce, the personnel having to be appropriately protected and to submit to the appropriate medical checks, thereby entailing substantial costs in addition to the already high cost of TGIC.

Accordingly, current research efforts are being directed towards replacing this polyester resin/TGIC system by other, less harmful and expensive systems.

These are precisely the reasons which have provided the incentive for the development and attainment of the present invention, in which new modified polyester resin/organic peroxide systems are proposed for powder coatings intended for the coating of aluminium supports which are going to be exposed to the weather.

There are numerous patents in which the use is described of organic peroxides as curing initiator for different types of resins, among which there may be mentioned JP 55027324 and JP 04227713 relating to polyester resins; JP 57209965A relating to polyolefin resins; US 4410680A and EP 503866A relating to epoxy resins; JP 52103427A relating to organopolysiloxane resins; and DE 2461416A relating to polyurethane resins.

In these patents, typical peroxides are employed, such as dicumyl peroxide, 2,5-dimethyl-2,5-di(tert-butylperoxy) hexane, 2,5-dimethyl-2,5-di(tert-butylperoxy)-3-hexene, 2,5-dimethyl-2,5-bis(2-ethylhexanoylperoxy)hexane, benzoyl peroxide, p-chlorobenzoyl peroxide, t-butylperbenzoate, cyclohexanone peroxide, cumene hydroperoxide, t-butyl hydroperoxide, and the like.

With these systems, coatings of different qualities are obtained on very diverse types of substrates.

With reference more specifically to the case of polyester resins cured with organic peroxides, the following may be mentioned: JP 49128939, JP 49040348, JP 55025462, DE2332749, JP 54150440, JP 55027307, JP 56100870, JP 55003416, JP 54158440, JP 52150443, JP 49129725 and JP 49093425. In the majority of these patents, the addition of the peroxide takes place during the preparation of the copolymer or the production of the resin. Moreover, in the majority of cases, the coatings obtained from these systems are intended for the application to steel substrates.

According to JP 52250443, 54150440, 54158440, 55027307 and 56100870 a polyester powder contains a radical-generating agent together with a metal or metallic compound or together with a specific radical trapping compound or absorbed on finely divided inorganic powder.

JP-04/227713 describes polyesters prepared from saturated and unsaturated carboxylic acids, saturated and unsaturated alcohols and organic peroxides as curing agent, for example 2,5-dimethyl-2,5-di(tert-butylperoxy)hexane. The polyesters are useful for powder coating material. They cure rapidly at low temperature.

According to JP 55025462 a powder composition comprises an unsaturated polyester from aromatic dicarboxylic acid, a dihydroxypropane and a resin of unsaturated bonds and also a radical generator, e. g. cyclohexanoneperoxide. This composition may also comprise low molecular weight polyesters, pigments, a curing agent. The baking process proceeds at 140 to 240° C. for 3 to 14 minutes.

In JP 56060911 a powder paint composition contains an unsaturated polyester from unsaturated di-carboxyded acid and polyvalent alcohol, an organic peroxide as curing catalyst and/or a curing auxiliary catalyst. The composition is baked at 160 to 230° C. for 5 to 30 minutes.

SUMMARY OF THE INVENTION

Given the state of the art defined in the above paragraphs, new modified polyester resin/organic peroxide systems are proposed which overcome the drawbacks of toxicity and price presented by TGIC, which may be baked at lower temperature and shorter time and which are especially suitable for aluminium substrates.

DETAILED DESCRIPTION OF THE INVENTION

The present invention, relates to new modified polyester resin/organic peroxide systems for powder coatings, intended especially for the coating of aluminium substrates, and in particular for both decorative and protective coatings which are going to be subjected to the weather.

The present invention relates to coatings based on resin of unsaturated linear or branched polyesters of appropriate molecular weight, which can be crosslinked by the action of free radicals obtained by means of organic peroxides which permit the formulation of powder coatings with appropriate melt viscosity and a glass transition temperature above 40° C., with consequent chemical and physical stability on storage.

The polymers or resins for the present invention are hydroxylated or carboxylated polyesters which possess unsaturation in their chain, obtained by reacting polycarboxylic acids or anhydrides with polyhydroxylated alcohols. The unsaturation in the polyester may be obtained according to:

a) Use of olefinically unsaturated di- or polycarboxylic acids or anhydrides.

b) Use of acrylic or methacrylic acid and/or its esters as chain terminators of hydroxylated polyesters.

c) Use of allyl compounds and their derivatives as chain terminators of carboxylated polyesters.

d) Olefinically unsaturated polyesters modified with dicyclopentadiene.

The functional groups of the polymer permit the crosslinking of chains, by addition to its double bonds and via a free radical mechanism, the requisite free radicals having been obtained by decomposition of organic peroxides, either thermally or chemically. The terminal hydroxyl or carboxyl functions, which regulate the molecular weight of the polymer, likewise permit a dual crosslinking, with blocked isocyanates, amine resins, hydroxyalkylamides and aromatic or aliphatic epoxy resins.

The number average molecular weight Mn of the unsaturated binding agent or polymer of the invention varies between 2,000 and 15,000, the degree of branching of the polymer being between 2 and 4.

In the case of the unsaturated polyester with carboxylate functions, the value of the acid number (measured as the number of milligrams of potassium hydroxide required to neutralize the free acid in 1 g of resin) can vary between 15 and 100 mg KOH/g, and preferably between 20 and 75, the hydroxyl number being less than 10 mg KOH/g.

The polyester can possess an excess of hydroxyl groups, in which case the hydroxyl number (expressed as milligrams of potassium hydroxide per gram of resin required to neutralize the excess acetic acid liberated on saponifying the polyester) can vary between 15 and 350 mg KOH/g of sample, and preferably between 25 and 80, the acid number being less than 10 mg KOH/g.

The polyester of the invention comprises the esterification product of one or more aliphatic, aromatic or cycloaliphatic di- or polycarboxylic acids or anhydrides or their methyl esters, which have 2 to 36 carbon atoms; examples of these are adipic acid, succinic acid, sebacic acid, suberic acid, azeleic acid, decanedicarboxylic acid, glutaric acid, isophthalic acid, phthalic acid or anhydride, naphthalenedicarboxylic acid, hexahydrophthalic acid or anhydride, 1,4-cyclohexanedicarboxylic acid, dimerized fatty acids and trimellitic anhydride. The molecular weight of the polymer may be regulated by the addition of aliphatic or aromatic monocarboxylic acids, or their methyl esters, having 2 to 18 carbon atoms. The percentage of the acid(s) or anhydride(s) described above with respect to the whole of the polymer varies between 20 and 70%, and preferably between 30 and 60%, of only one of them or mixture of several.

The unsaturation of the polymer of the invention may be obtained by using olefinically unsaturated di- or polycarboxylic acids or anhydrides, such as maleic acid or anhydride, tetrahydrophthalic acid or anhydride, fumaric acid, hexachloro-endo-methylenetetrahydrophthalic acid or anhydride, methylmaleic acid, itaconic acid or adducts of dicyclopentadiene with methylmaleic, itaconic, maleic or fumaric acid.

The percentage of unsaturated acid or anhydride is fundamental to the subject of the invention; it varies between 5 and 50%, and preferably between 10 and 40%.

The polyhydroxylated alcohols which are useful for the synthesis of polyester are, for example: ethylene glycol, 1,2- or 1,3-propylene glycol, 2-methylpropanediol, di- ethylene glycol, dipropylene glycol, 1,4-butanediol, 2,3-butylene glycol, 1,6 hexanediol, 1,5-pentanediol, neopentyl glycol, cyclohexanedimethanol, triethylene glycol, neopentyl glycol hydroxypivaloate, tetraethylene glycol, poly-ethylene glycol, dibutylene glycol or polybutylene glycol, trimethylpentanediol, butylethylpropanediol, glycerol, trimethylolpropane, hexanetriol, pentaerythritol, sorbitol, trimethylolethane and tris(2-hydroxyethyl)isocyanurate. The percentage of these compounds can vary between 10 and 60%, and preferably between 10 and 50%.

The unsaturation of the polyesters of the invention may be obtained, as indicated, either by esterification or transesterification of hydroxylated polyesters with acrylic or methacrylic acid and their esters, as a result of which polyesters functionalized at the end of the chain are obtained.

Another system for functionalizing the chain of the polymer with double bonds is the reaction of allyl alcohol or its derivatives and carboxylated polyesters, for example allyl alcohol, propoxylated allyl alcohol, trimethylol-propane diallyl ether, pentaerythritol triallyl ether and the like.

The unsaturated polyesters used in the invention possess a glass transition temperature (Tg) of between 40 and 80° C., and preferably between 50 and 70° C., in order to endow the system with requisite stability on storage.

As regards the curing initiator, as already mentioned above, an organic peroxide capable of generating free radicals, thermally or chemically, is employed.

Organic peroxides which are especially appropriate for the present invention are listed in Table 1 below, in which the minimum curing temperatures of these compounds are also noted.

TABLE 1

| Peroxide | Temperature |
| --- | --- |
| 3,3-Bis(t-butylperoxy)ethyl butyrate | 150° C. |
| 1,1-Bis(t-butylperoxy)-3,3,5-tri-methylcyclohexane | 140° C. |
| Hexamethyltetraoxacyclononanone | 190° C. |
| 1,3-Bis(t-butylperoxyisopropyl)benzene | 170° C. |
| Dicumyl peroxide | 160° C. |
| t-Butyl perbenzoate | 140° C. |
| 2,5-Dimethyl-2,5-di(t-butylperoxy)hexane | 170° C. |

The incorporation of the peroxide in the coating formulation will be performed by means of mixing and extrusion together with the remaining components of the formular, by prior addition to the polyester resin or to any other component of the formula, or alternatively at the end of the manufacturing process by means of a special addition technique.

The relative proportions of resin and organic peroxides may vary between 55 to 60% by weight of resin and 0.5 to 3% by weight of organic peroxide, based on the final formulation.

The additives to be used will be the ones customarily employed in powder coating: surfactants, photostabilizers, antioxidants, catalysts, electrical conductivity correctors, flame retardants, and the like.

The application of the coating to an aluminium substrate will be achieved by means of the electrostatic charge on the particles of powder and their subsequent spraying onto the material to be coated. Application by immersion in a fluidized coating bed may also be used.

Appropriate polymerization or curing will take place in a heating oven (employing convection, radiation, induction or any other system) capable of exceeding 100° C. The residence time will vary between 20–30 seconds and several minutes, depending on the type of oven chosen and the temperature selected. So the curing time is several minutes when using a temperature a little higher than 100° C., e. g. with a temperature between 120 and 140° C.

It may be seen from the foregoing that the modified polyester resin/organic peroxide systems of the present invention provide a significant advance in the current state of the art.

In the first place, they effect a replacement of the use of a harmful and expensive curing agent by organic peroxides which are much cheaper and much less detrimental to health and to the environment.

Secondly, they enable powder coatings to be obtained which are capable of curing at temperatures below the ones currently being employed, which also reduces the costs of application.

Thirdly, coatings on temperature sensitive substrates like plastics and metallic substrates, especially on aluminium substrates with exceptional characteristics and high resistance are obtained. When coating a temperature sensitive substrate, e. g. plastics, a conductive primer may be used.

EMBODIMENTS OF THE INVENTION

The present invention is further illustrated by means of the following example, which does not seek to limit its scope.

EXAMPLE (1) Formulation of a powder coating according to the present invention.

|  | % by weight |
|---|---|
| Pigment (1) | 20.00–30.00 |
| Resin (2) | 55.00–60.00 |
| Curing initiator (3) | 0.50–3.00 |
| Corrective additive (4) | 0.45–1.00 |
| Corrective additive (5) | 0.25–0.50 |
| Stabilizer (6) | 0.05–0.25 |
| Extender (7) | 10.00–20.00 |

(1) Titanium dioxide
(2) Modified polyester
(3) Dicumyl peroxide
(4) Acrylate copolymer
(5) Polypropylene wax
(6) Phosphonite
(7) Barium sulphate (2) The process of manufacture of this coating may be carried out by three different possible procedures, depending on what system is chosen for incorporation of the organic peroxide:

First Procedure:

A.—After being weighed out, as are the remaining components of the formula, the organic peroxide is blended in a suitable blender.

B.—The blend prepared as described above is passed through a suitably adjusted extruder in which, by means of mechanical action under fully controlled temperature conditions, appropriate homogenization of the different components of the formula takes place.

The extruded product is cooled rapidly to avoid possible prepolymerization and is then ground.

C:—The final phase of the process is completed by conversion of the product to powder with a particle size varying between 1 and 500 microns.

Second Procedure:

In this case, the use is envisaged of an organic peroxide previously incorporated in the resin or in any other component of the formula.

A.—The different components, including the one in which the organic peroxide has been incorporated, are weighed out systematically and blended in a suitable blender.

B.—Same as in the first possible procedure.

C.—Same as in the first possible procedure.

Third procedure:

The last possibility contemplated is the incorporation of the organic peroxide in an additional phase of manufacture.

A.—The weighing out and blending of all the components except for the organic peroxide are carried out under the conditions described in the above possible procedures.

B.—Same as in the above two possible procedures.

C.—Same as in the above two possible procedures.

D.—In this additional phase and by means of the use of a special technique of addition and blending, the organic peroxide, pure or in the form of a solid or liquid masterbatch, is incorporated.

(3) The application of the finished coating to the aluminium substrate, as mentioned above, may be carried out using the techniques currently used in industry.

A.—By means of electrostatic spraying of the powder coating.

This system is the one most commonly used in industry, and consists in imparting to the particles of powder, with the aid of a suitable spray gun, the electrostatic charge required to facilitate adhesion to the support through opposition of charges between the two.

To transfer the electrostatic charge, two systems may fundamentally be used:

First system: Particles of powder are impelled, with the aid of compressed air, through the spray gun. An electrode mounted at the end of the latter generates the high voltage which is transferred immediately to the powder.

Second system: In this case, in order to facilitate the electrostatic charging of the powder, the technique used entails friction between the particles of powder, mixed with the air used to impel them, and the spray gun itself which, being constructed from a special plastic material (PTFE), facilitates the relinquishing of electrons from the coating, leaving the latter positively charged.

B.—By means of a fluidized bed.

The powder coating is placed in a vessel having a bottom which, being porous, facilitates the passage of air under pressure and at a stable flowrate, which produces the immediate fluidization of the coating.

The material to be coated is immersed in this medium so that the coating deposits on its surface, either because an electrostatic charge has been conferred on the latter, or else because prior preheating of the material had been carried out.

The application should be finished off in all cases by the corresponding polymerization of the coating, processing it in an oven for a time which can vary between 20–30 seconds and several minutes in accordance with the temperature selected.

What is claimed is:

1. A modified polyester resin/organic peroxide system for powder coating which is applicable to temperature sensitive substrates and to metallic substrates comprising:
   a) a polyester resin which is a hydroxylated or carboxylataed polyester which possesses unsaturation in the chain and which originates from the reaction of polycarboxylic acid or anhydrides with polyhydroxylated alcohols, the unsaturation originating from olefinically unsaturated di- or polycarboxylic acids or anhydrides, acrylic or methacrylic acid and/or its esters, allyl compounds, or dicyclopentadiene, with molecular weights of between 2,000 and 15,000, the degree of branching being between 2 and 4,
   b) a curing agent consisting essentially of organic peroxide with a maximum curing temperature of between 140 and 190° C.; the relative proportions of resin and organic peroxides being 55–60% by weight of resin based on the final composition and 0.5–3.0% by weight of organic peroxide based on the final formulation.

2. The modified polyester resin/organic peroxide system according to claim 1, wherein the polyester resins have a glass transition temperature of between 40 and 80° C., with an acid number between 15 and 100 mg KOH/g and a hydroxyl number less than 10 mg KOH/g in the case of carboxylated polyesters and with a hydroxyl number between 15 and 350 mg KOH/g and an acid number less than 10 mg KOH/g in the case of hydroxylated polyesters.

3. The modified polyester resin/organic peroxide system according to claim 1 to wherein the polyester resins have a glass transition temperature of between 50 and 70° C.

4. The modified polyester resin/organic peroxide system according to claim 1 to wherein the carboxylated polyester has an acid number between 20 and 75 mg KOH/g.

5. The modified polyester resin/organic peroxide system according to claim 1 to wherein the hydroxylated polyester has a hydroxyl number between 25 and 80 mg KOH/g.

6. The modified polyester resin/organic peroxide system according to claim 1 to wherein the percentage of the olefinically unsaturated di- or polycarboxylic acid or anhydride in the polyesters varies between 5 and 50% by weight.

7. The modified polyester resin/organic peroxide system according to claim 1 wherein the organic peroxides are selected from: 3,3-bis(t-butyl-peroxy)ethyl butyrate, 1,1-bis(t-butylperoxy)-3,3,5-trimethylcyclohexane, hexamethyltetraoxacyclononanone, 1,3-bis(t-butylperoxyisopropyl)benzene, dicumyl peroxide, t-butyl perbenzoate and 2,5-dimethyl-2,5-di(t-butyl peroxy)hexane.

8. The modified polyester/organic peroxide system of claim 1 wherein the temperature sensitive substrate includes a plastic.

9. The modified polyester/organic peroxide system of claim 1 wherein the metallic substrate includes aluminum.

* * * * *